United States Patent
Hutchings et al.

(10) Patent No.: US 10,723,847 B2
(45) Date of Patent: Jul. 28, 2020

(54) COATING POWDERED POLYMER WITH A WATER-SOLUBLE DYE AS AN INDICATOR FOR POLYMER HYDRATION STATE

(71) Applicant: ProAction Fluids LLC, Shreveport, LA (US)

(72) Inventors: Nathan R. Hutchings, Shreveport, LA (US); John Paxton Monsour, Shreveport, LA (US); Ryan Humphrey, Shreveport, LA (US)

(73) Assignee: ProAction Fluids LLC, Shreveport, LA (US)

( * ) Notice: Subject to any disclaimer, the term of this patent is extended or adjusted under 35 U.S.C. 154(b) by 103 days.

(21) Appl. No.: 16/158,677

(22) Filed: Oct. 12, 2018

(65) Prior Publication Data

US 2020/0115510 A1   Apr. 16, 2020

(51) Int. Cl.
*C08J 3/05*   (2006.01)
*C08J 3/20*   (2006.01)
*C09B 67/08*   (2006.01)
*C09B 67/22*   (2006.01)

(52) U.S. Cl.
CPC ............. *C08J 3/203* (2013.01); *C08J 3/05* (2013.01); *C09B 67/0013* (2013.01); *C09B 67/0046* (2013.01); *C08J 2333/26* (2013.01); *C08J 2405/00* (2013.01); *C08J 2433/08* (2013.01)

(58) Field of Classification Search
None
See application file for complete search history.

(56) References Cited

U.S. PATENT DOCUMENTS

| | | | | | |
|---|---|---|---|---|---|
| 3,203,802 | A | * | 8/1965 | Burg | C08F 2/46 430/271.1 |
| 5,969,033 | A | * | 10/1999 | Pearlstine | C09B 67/0013 106/31.27 |
| 6,503,559 | B1 | * | 1/2003 | Nohr | C09B 67/0097 427/213.33 |
| 2003/0145988 | A1 | * | 8/2003 | Mullins | E21B 49/08 166/264 |
| 2004/0128775 | A1 | * | 7/2004 | Wuzik | C09B 67/0046 8/583 |
| 2006/0144588 | A1 | * | 7/2006 | Ferguson | E21B 47/1015 166/252.6 |
| 2007/0100023 | A1 | * | 5/2007 | Burns | C09B 67/0013 523/160 |
| 2007/0251028 | A1 | * | 11/2007 | Samain | A61K 8/355 8/405 |
| 2012/0282543 | A1 | * | 11/2012 | Pitarch Lopez | C09B 67/0013 430/108.23 |
| 2013/0101811 | A1 | * | 4/2013 | Kawaguchi | C09D 11/17 428/195.1 |
| 2013/0257974 | A1 | * | 10/2013 | Kawaguchi | C09D 11/324 347/20 |
| 2013/0342620 | A1 | * | 12/2013 | Fujie | C09D 11/328 347/100 |
| 2014/0128295 | A1 | * | 5/2014 | Wagles | C09K 8/08 507/111 |
| 2015/0062265 | A1 | * | 3/2015 | Omori | B41J 2/01 347/86 |
| 2015/0197653 | A1 | * | 7/2015 | Ando | C09D 129/04 524/127 |
| 2016/0303014 | A1 | * | 10/2016 | Grevalcuore | A61K 8/447 |
| 2016/0355040 | A1 | * | 12/2016 | Zhou | B41C 1/1066 |
| 2017/0239152 | A1 | * | 8/2017 | Goutsis | A61K 8/466 |
| 2018/0298274 | A1 | * | 10/2018 | Zhao | C09K 8/50 |

\* cited by examiner

*Primary Examiner* — Peter A Salamon
(74) *Attorney, Agent, or Firm* — Richard A. Fagin

(57) ABSTRACT

A method for determining hydration of a polymer includes mixing a water-soluble, powdered dye with a powdered polymer and introducing the mixed water-soluble, powdered dye and powdered polymer into a water-based fluid. Full hydration of the powdered polymer is determined when the mixed water-soluble, powdered dye, powdered polymer and water-based fluid comprises substantially no internal optical contrast.

11 Claims, No Drawings

COATING POWDERED POLYMER WITH A WATER-SOLUBLE DYE AS AN INDICATOR FOR POLYMER HYDRATION STATE

CROSS REFERENCE TO RELATED APPLICATIONS

Not Applicable.

STATEMENT REGARDING FEDERALLY SPONSORED RESEARCH OR DEVELOPMENT

Not Applicable

NAMES OF THE PARTIES TO A JOINT RESEARCH AGREEMENT

Not Applicable.

BACKGROUND

This disclosure relates to the field of polymers, such as powdered, dry polymers, added to liquids and liquid fluid systems. In such fluids and systems, the introduced polymer is hydrated as part of the mixing process. For solid polymers, such as powdered polymers, it is known in the art to improve the hydration rate of dry, powdered hydrophilic polymers, such as polyacrylamide, xanthan, guar, AMPS copolymers, and the like, by modifying the surface area (e.g. grinding) or increasing wettability (e.g. surfactants) to increase hydration rate of the powder. The mixing time of a dry, powdered polymer or powdered polymer blend in a remote batch mixing system, such as an HDD (horizontal directional drilling) drilling fluid mixing tank in the field, or an oil and gas drilling mud or polymer fluid mixing tank, is dependent on many variables including the temperature of the solvent (e.g., water, the quality of the solvent, the shear-rate of the mixing system, and the rate of addition of the powdered polymer, among others. Presently, the industry lacks a quick, visual or optical method for determining the completeness or hydration efficiency of a polymer or polymer mix.

DETAILED DESCRIPTION

A method and composition according to the present disclosure is intended to provide a means to visually or optically assess the hydration state of a polymer or polymer mixture without affecting the rheological properties of the polymer.

A composition for a coating for a dry polymer or polymer blend may comprise a water-soluble, powdered dye so as to effectively mark the polymer granules with a (locally) high concentration of dye when the dye-coated polymer is added to water, a water-based fluid or fluid system. Due to the substantial difference in molecular size and molecular weight between the dye and the polymer(s), when introduced to water, a water-based fluid or fluid system, the dye is more quickly wetted as the polymer(s) begins to hydrate and a significant amount of the dye may become entangled into the partially-hydrated polymer. The foregoing creates a visual or optical contrast that marks the polymer granules. As the polymer continues to hydrate toward complete hydration, the dye contemporaneously disperses into the fluid system. As the fluid system progresses toward full hydration of the polymer, any remaining partially-hydrated polymer granules, fully hydrated/yielded polymer, and dye approach the consistency of a homogeneous mixture, ultimately a completely homogeneous mixture. The fluid system thus comprises substantially no optical or visual contrast.

In some embodiments, powdered, water soluble dye such as Acid Blue-9, Basic Blue 7, Acid Red-52 or any other colored, finely ground, water-soluble marking dye powder or the like, is mixed at 0.001% to 1% by weight with powdered polymer or blends of such polymers such as, but not limited to, polyacrylamide, AMPS-copolymers, Xanthan, Guar/derivatized Guar, Cellulose/derivatized Cellulose, or the like, until the dye is evenly dispersed within and adhered to the polymer powder. The mixing may be performed, for example, in a mortar-like mixer.

The polymer having therein the dispersed dye may be introduced into water, a water-based fluid or fluid system, e.g., in a mixing tank equipped with a mixing pump, paddle mixer, or any mechanical agitator designed to stir the fluid, the dye and the polymer, wherein the objective is to produce a homogeneous polymer solution. As soon as the fluid wets the dye-coated polymer granules, the polymer granules become stained with the dye which serves as a visual or optical indicator of the hydration state of the polymer while mixing.

The foregoing fluid system can be considered fully hydrated when there is no apparent visual or optical contrast between the polymer and dye, e.g., the fluid system is a homogeneous consistency and color.

In some embodiments, the dye may be one part of a coating system wherein the dye is mixed with other coating additives before, after, or concurrently with the polymer granules.

In some embodiments, the dye and AMPS-Polyacrylic Acid copolymer and polyacrylamide are combined in a mortar mixer at weight ratios of 0.033% dye to 74.97525% AMPS-acrylic acid copolymer to 24.99175% polyacrylamide, respectively. In related embodiments, the AMPS-acrylic acid copolymer and the polyacrylamide may be mixed at weight ratios of 0% to 99.967%, respectively with 0.033% finely-ground powdered dye.

In some embodiments, the polymer is introduced to the mixer before the dye.

In some embodiments, the dye is added in the form of a powder to the mixer and may be allowed to mix, e.g., for 20 to 30 minutes, or until the color of the polymer and dye mixture is nearly homogeneous In some embodiments, the dye is added as a powder before a secondary coating is added to the mixer and the dye is allowed to mix until nearly homogeneous before the secondary coating is added.

In some embodiments, the dye-coated polymer is subsequently used to create batches of drilling fluid for a horizontal direction drill (e.g. boring machine).

In some embodiments, a mixture of dye and polymer is added to water at rates of 0.5-63 pounds/500 gallons (0.012%-1.5% by weight) to make batches of drilling fluid.

In some embodiments, the fluid is visually monitored for contrast and/or homogeneity to assess completeness of mixing and readiness for use of the mixed polymer rather than using mixing time or other means to assess the completion of mixing.

In some embodiments other "mud" additives, such as surfactants, pH modifiers, water softeners, other viscosifiers, filtration-control aids, and lubricants may be combined into the mixture to modify the rheological properties or chemical properties of the fluid system prior to use as a drilling fluid.

Although only a few examples have been described in detail above, those skilled in the art will readily appreciate that many modifications are possible in the examples.

Accordingly, all such modifications are intended to be included within the scope of this disclosure as defined in the following claims.

What is claimed is:

1. A method for determining hydration of a polymer, comprising:
   mixing a water-soluble, powdered dye with a powdered polymer;
   introducing the mixed water-soluble, powdered dye and powdered polymer into a water-based fluid; and
   determining full hydration of the powdered polymer when the mixed water-soluble, powdered dye, powdered polymer and water-based fluid comprises substantially no internal optical contrast.

2. The method of claim 1 wherein the water-soluble, powdered dye is 0.001 percent to 1.0 percent by weight of the mixed water-soluble, powdered dye and powdered polymer.

3. The method of claim 1 wherein the water-soluble, powdered dye comprises at least one of Acid Blue-9, Basic Blue 7 and Acid Red-52.

4. The method of claim 1 wherein the powdered polymer comprises at least one of polyacrylamide, AMPS-copolymers and Xanthan.

5. The method of claim 1 wherein the water-soluble, powdered dye, AMPS polymer and Polyacrylic Acid are combined in a mortar mixer at weight ratios of 0.033% dye to 74.97525% AMPS-acrylic acid copolymer to 24.99175% polyacrylamide, respectively.

6. The method of claim 5 wherein the powdered AMPS polymer and Polyacrylic Acid is added to the mixer before the water soluble, powdered dye.

7. The method of claim 6 wherein the water soluble, powdered dye is added as a powder to the mixer and allowed to mix until a color of the powdered AMPS polymer and Polyacrylic Acid is substantially homogenous.

8. The method of claim 6 wherein the dye is added as a powder before a secondary coating is added to mixer and allowed to mix until nearly homogeneous.

9. The method of claim 6 wherein the powdered, water-soluble dye is mixed with a secondary coating material and concurrently added to the mixer and allowed to mix until nearly homogenous.

10. The method of claim 1 wherein the mixed water-soluble, powdered dye and powdered polymer is added to water in amounts of 0.5-63 pounds of the mixed water-soluble, powdered dye and powdered polymer per 500 gallons (0.012%-1.5% by weight) of water to make batches of drilling fluid.

11. The method of claim 1 further comprising adding at least one of a surfactant, a pH modifier, a water softener, and a viscosifier is added to the mixed water-soluble, powdered dye, powdered polymer and water-based fluid.

* * * * *